US011003888B2

(12) United States Patent
Liao (10) Patent No.: US 11,003,888 B2
(45) Date of Patent: May 11, 2021

(54) FINGERPRINT RECOGNITION DEVICE (71) Applicant: CHICONY ELECTRONICS CO., LTD., New Taipei (TW)

(72) Inventor: Chih-Liang Liao, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 70 days.

(21) Appl. No.: 16/661,471

(22) Filed: Oct. 23, 2019

(65) Prior Publication Data
US 2020/0226349 A1 Jul. 16, 2020

(30) Foreign Application Priority Data

Jan. 14, 2019 (TW) ................. 108101399

(51) Int. Cl.
G06K 9/00 (2006.01)
G02B 5/04 (2006.01)
(52) U.S. Cl.
CPC ......... G06K 9/00046 (2013.01); G02B 5/045 (2013.01)

(58) Field of Classification Search
None
See application file for complete search history.

(56) References Cited

U.S. PATENT DOCUMENTS

2012/0256827 A1 10/2012 Ahn et al.
2013/0321345 A1 12/2013 Burns

Primary Examiner — Nicholas J Lee
(74) Attorney, Agent, or Firm — Muncy, Geissler, Olds & Lowe, P.C.

(57) ABSTRACT

The present disclosure discloses a fingerprint recognition device, which includes a luminescent display panel, a substrate, an image capturing module, a plurality of first prism arrays and a plurality of second prisms. The first prism arrays are disposed on the substrate and paralleled to each other, and each of the first prism arrays receives an incident ray from the luminescent display panel. The first prism arrays provide a first light guiding direction, and the first light guiding direction is orthogonal to the incident ray. The second prisms are disposed on the substrate, and the second prisms are corresponding to the first prism arrays respectively. Each of the second prisms has a light-emitting surface, and the light-emitting surface faces toward the image capturing module. The second prisms provide a second light guiding direction, and the second light guiding direction is perpendicular to the first light guiding direction.

21 Claims, 12 Drawing Sheets

FINGERPRINT RECOGNITION DEVICE

BACKGROUND

1. Technical Field

The present disclosure relates to a fingerprint recognition device, and more particularly, to a light guiding technology of a fingerprint recognition device.

2. Description of the Related Art

Fingerprint recognition is a biometric recognition technology that uses the unique fingerprint pattern of human finger to achieve the function of identifying or confirming identity. Fingerprint recognition technology is widely used in various fields. For example, most smart phones currently have fingerprint recognition functions to provide fingerprint encryption and fingerprint unlocking functions.

According to different sensing mechanisms, fingerprint recognition devices can be categorized as capacitive or optical type fingerprint recognition devices. The capacitive type fingerprint recognition device recognizes a fingerprint pattern by sensing a capacitance or electric field change caused by a finger touch. The optical type fingerprint recognition device generally comprises a light source, an image capturing component, and a light transmitting component. The light source emits light and illuminates the finger that presses on the light transmitting component. Since the fingerprint is consisted of a plurality of irregular ridges and concave grooves, the light reflected by the ridges and the concave grooves forms a fingerprint image of interlaced light and dark stripes on the receiving surface of the image capturing component. The image capturing component converts the fingerprint image into corresponding image data, and then transmits the image data to the processing unit for the processing unit to use algorithm to perform fingerprint recognition, which can be used for identifying the user.

However, in the above image capturing process, the light reflected by the fingerprint is easily scattered when transmitting to the image capturing component, and thus the quality of the captured image cannot be good. In addition to affecting the recognition result, the poor light transmission effect also makes the fingerprint recognition device unable to detect the fingerprint in the whole region.

SUMMARY

In view of the above problems, the main object of the present disclosure is to provide a fingerprint recognition device, wherein a plurality of first prism arrays is arranged on a substrate and is parallel to each other, thereby solving the problems that the quality of the captured image of the fingerprint recognition device of the conventional fingerprint recognition device is not good and the fingerprint recognition device cannot be applied to the whole region.

In order to achieve the above object, the present disclosure provides a fingerprint recognition device, which comprises a luminescent display panel, a substrate, an image capturing module, a plurality of first prism arrays, and a plurality of second prisms. The luminescent display panel has a cover. The substrate is disposed on a side of the luminescent display panel opposite to the cover. The image capturing module is disposed on one side of the substrate. The first prism arrays are disposed on the substrate and paralleled to each other, and each of the first prism arrays receives an incident ray from the luminescent display panel, the first prism arrays provides a first light guiding direction, wherein the first light guiding direction is orthogonal to the incident ray. The second prisms are disposed on the substrate, and the second prisms correspond to the first prism arrays respectively. Each of the second prisms has a light-emitting surface, with the light-emitting surface facing toward the image capturing module. The second prisms provide a second light guiding direction, wherein the second light guiding direction is perpendicular to the first light guiding direction.

According to an embodiment of the present disclosure, the incident ray enters the first prism arrays and is guided along the first light guiding direction to the second prisms, and is then guided along the second light guiding direction to the image capturing module.

According to an embodiment of the present disclosure, the first prism arrays comprise a plurality of first isosceles triangle prisms and a plurality of second isosceles triangle prisms, and a bottom surface of each of the first isosceles triangles faces the luminescent display panel, a bottom surface of each of the second isosceles triangles faces the substrate, and the first isosceles triangle prisms and the second isosceles triangle prisms are alternately arranged with respect to one another.

According to an embodiment of the present disclosure, each of the first arrays further comprises a plurality of lenses respectively disposed on the bottom surfaces of the first isosceles triangle prisms.

According to an embodiment of the present disclosure, each of the second prisms is a right triangle prism respectively, and a right angle end of the right triangle prism is close to one of the first prism arrays.

According to an embodiment of the present disclosure, the substrate comprises a reflective layer.

According to an embodiment of the present disclosure, the luminescent display panel is an organic light-emitting display panel.

In order to achieve the above object, the present disclosure further provides a fingerprint recognition device, which comprises a luminescent display panel, a substrate, an image capturing module, a plurality of first prism arrays, a plurality of second prisms, and a light turning prism. The luminescent display panel has a cover. The substrate is disposed on a side of the luminescent display panel opposite to the cover. The image capturing module is disposed on one side of the substrate opposite to the luminescent display panel. The first prism arrays are disposed on the substrate and paralleled to each other, and each of the first prism arrays receives an incident ray from the luminescent display panel, the first prism arrays provides a first light guiding direction, wherein the first light guiding direction is orthogonal to the incident ray. The second prisms are disposed on the substrate, and the second prisms correspond to the first prism arrays respectively. Each of the second prisms has a light-emitting surface, the second prisms provides a second light guiding direction, wherein the second light guiding direction is perpendicular to the first light guiding direction. The light turning prism is disposed on the substrate, with the light-emitting surface of each of the second prisms facing the light turning prism. The light turning prism provides a third light guiding direction, wherein the third light guiding direction is orthogonal to the second light guiding direction and is directed toward the image capturing module.

According to an embodiment of the present disclosure, the incident ray enters the first prism arrays and is guided along the first light guiding direction to the second prisms, and is then guided along the second light guiding direction to the light turning prism, and is then guided along the third light guiding direction to the image capturing module.

According to an embodiment of the present disclosure, the light turning prism comprises a right angle prism, an amici prism, or a pentaprism.

According to an embodiment of the present disclosure, the first prism arrays comprise a plurality of first isosceles triangle prisms and a plurality of second isosceles triangle prisms. A bottom surface of each of the first isosceles triangles faces the luminescent display panel, a bottom surface of each of the second isosceles triangles faces the substrate, and the first isosceles triangle prisms and the second isosceles triangle prisms are alternately arranged with respect to one another.

According to an embodiment of the present disclosure, each of the first arrays further comprises a plurality of lenses respectively disposed on the bottom surfaces of the first isosceles triangle prisms.

According to an embodiment of the present disclosure, each of the second prisms is a right triangle prism respectively, and a right angle end of the right triangle prism is close to one of the first prism arrays According to an embodiment of the present disclosure, the substrate comprises a reflective layer.

According to an embodiment of the present disclosure, the luminescent display panel is an organic light-emitting display panel.

In order to achieve the above object, the present disclosure further provides a fingerprint recognition device, which comprises a luminescent display panel, a substrate, an image capturing module, a plurality of first prism arrays, and an optical waveguide component. The luminescent display panel has a cover. The substrate is disposed on a side of the luminescent display panel opposite to the cover. The image capturing module is disposed on one side of the substrate opposite to the luminescent display panel. The first prism arrays are disposed on the substrate and paralleled to each other. Each of the first prism arrays receives an incident ray from the luminescent display panel; each of the first prism arrays provides a first light guiding direction, wherein the first light guiding direction is orthogonal to the incident ray. The optical waveguide component is disposed on the substrate, the optical waveguide component comprises a light incident surface and a light guiding path, wherein the light incident surface faces the first prism arrays, and the light guiding path faces the image capturing module.

According to an embodiment of the present disclosure, the incident ray enters the first prism arrays and is guided to the optical waveguide component along the first light guiding direction, and is then guided along the light guiding path to the image capture module.

According to an embodiment of the present disclosure, the first prism arrays comprise a plurality of first isosceles triangle prisms and a plurality of second isosceles triangle prisms. A bottom surface of each of the first isosceles triangles faces the luminescent display panel, a bottom surface of each of the second isosceles triangles faces the substrate, and the first isosceles triangle prisms and the second isosceles triangle prisms are alternately arranged with respect to one another.

According to an embodiment of the present disclosure, each of the first arrays further comprises a plurality of lenses respectively disposed on the bottom surfaces of the first isosceles triangle prisms.

According to an embodiment of the present disclosure, the substrate comprises a reflective layer.

According to an embodiment of the present disclosure, the luminescent display panel is an organic light-emitting display panel.

As above, the fingerprint recognition device of the present disclosure has the first prism arrays arranged in parallel with each other on the substrate, wherein the first prism arrays work with the second prisms, light turning prism or the optical waveguide component to effectively transmit the incident ray emitted by the luminescent display panel to the image capturing module. Since the first prism arrays are arranged in parallel with each other on the substrate, the light can be effectively transmitted to the image capturing module for the image capturing module to obtain the image on the whole surface of the cover. In other words, in addition to effectively providing the quality of the captured image, the whole surface of the cover can also serve as a sensing area for fingerprint recognition.

DETAILED DESCRIPTION OF THE EMBODIMENTS

In order to make the structure and characteristics as well as the effectiveness of the present disclosure to be further understood and recognized, the detailed description of the present disclosure is provided as follows along with embodiments and accompanying figures.

Figure 1A:
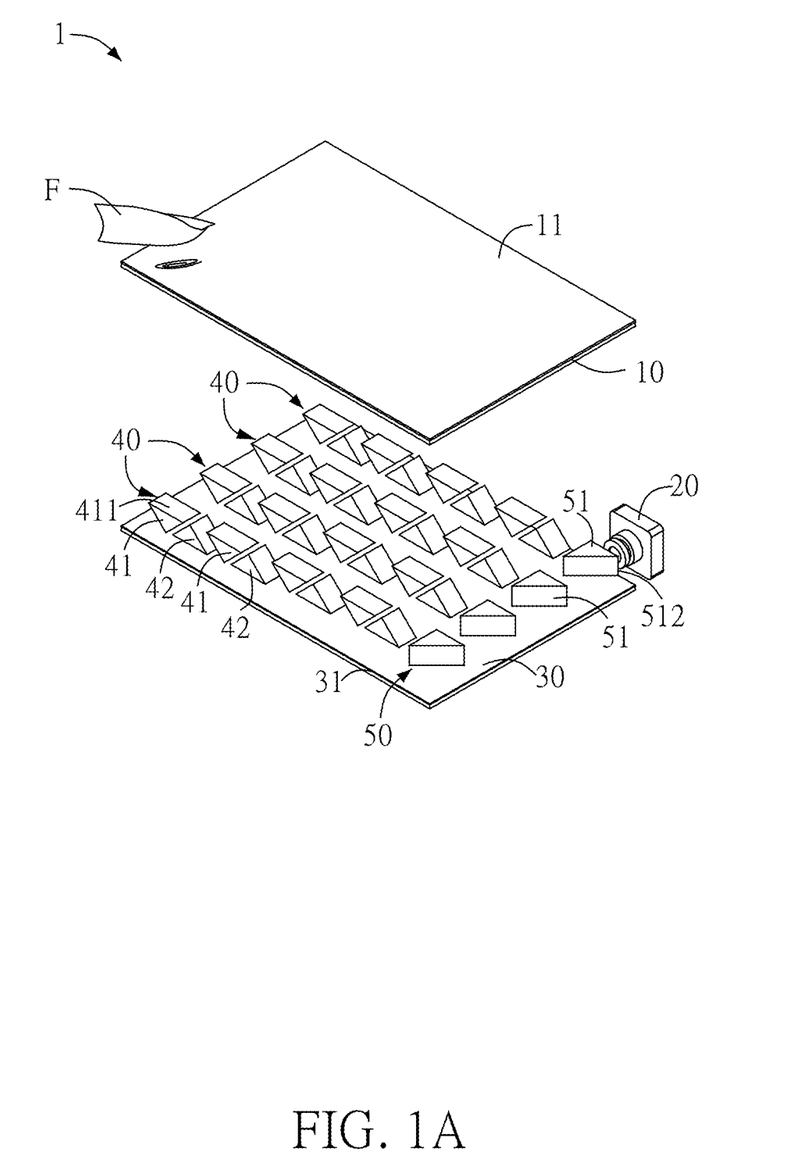
FIG. 1A illustrates a schematic diagram of a fingerprint recognition device according to an embodiment of the present disclosure.

Refer to FIG. 1A, which illustrates a schematic diagram of a fingerprint recognition device according to an embodiment of the present disclosure. A fingerprint recognition device 1 comprises a luminescent display panel 10, an image capturing module 20, a substrate 30, a plurality of first prism arrays 40, and a second prism array 50. First, the fingerprint recognition device 1 of the present embodiment can be applied in an Organic Light-Emitting Diode (OLED) display device. Therefore, the luminescent display panel 10 is illustrated as an OLED display panel. Since the organic light emitting diode can emit light by itself, it is not necessary to separately provide a backlight module, and can be used as a light source of the fingerprint recognition device 1 of the embodiment. Moreover, the luminescent display panel 10 has a cover 11, which can be a glass cover for the touch operation of the user, and a fingerprint sensing area that can be pressed by the finger F of the user. In this embodiment, the entire area of the surface of the cover 11 can serve as a fingerprint sensing area.

The substrate 30 is disposed on a side of the luminescent display panel 10 relative to the cover 11. Specifically, the upper surface of the luminescent display panel 10 is a cover 11, and the substrate 30 is disposed on a lower surface of the luminescent display panel 10. The image capturing module 20 of the embodiment is disposed on one side of the substrate 30. Specifically, the image capturing module 20 and the substrate 30 of the embodiment are disposed on the same plane and are located on one of the four sides of the substrate 30. In this embodiment, the image capturing module 20 is disposed on the rear side of the substrate 30 and close to the right side.

The first prism arrays 40 and the second prisms array 50 are both disposed on the substrate 30, preferably disposed on the surface of the substrate 30 close to the luminescent display panel 10. In this embodiment, the prism combination of each row is referred to as the first prism arrays 40, and the prism combination of column is referred to as the second prism array 50, and the second prism array 50 is close to the image capturing module 20. In other words, the fingerprint recognition device 1 has a plurality of first prism arrays 40, and the plurality of first prism arrays 40 of each row is disposed in parallel with each other on the substrate 30. Further, the second prism array 50 comprises a plurality of second prisms 51, and the number of second prisms 51 of the present embodiment is the same as the number of columns of the first prism arrays 40, so the second prisms 51 correspond to the first prism arrays 40 of the respective columns respectively. In addition, each second prism 51 has a light-emitting surface 512, and the light-emitting surface 512 faces the image capturing module 20.

Figure 1B:
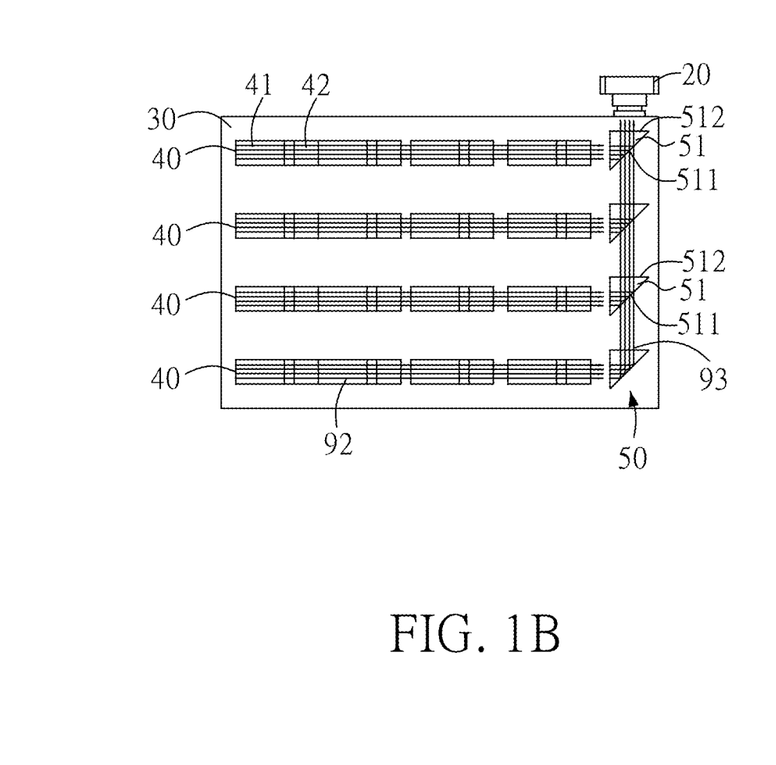
FIG. 1B illustrates a top view of the image capturing module, the substrate, the first prism arrays, and the second prisms shown in FIG. 1A.
Figure 1C:
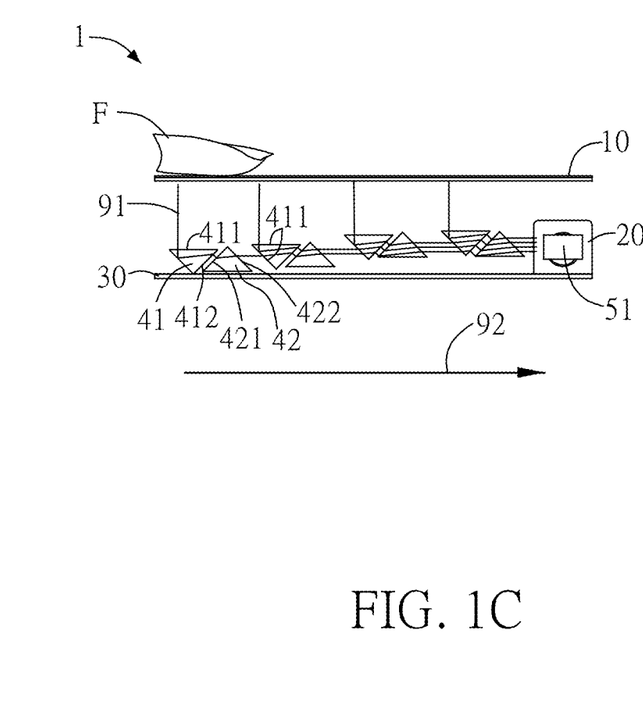
FIG. 1C illustrates a front view of the fingerprint recognition device shown in FIG. 1A.

FIG. 1B illustrates a top view of the image capturing module, substrate, the first prism arrays, and the second prisms shown in FIG. 1A, and FIG. 1C illustrates a front view of the fingerprint recognition device shown in FIG. 1A, please refer to FIG. 1A to FIG. 1C at the same time. The substrate 30 and the first prism arrays 40 are disposed on the lower surface of the luminescent display panel 10, so that the first prism arrays 40 can receive an incident ray 91 from the luminescent display panel 10. In this embodiment, the first prism arrays 40 respectively provide a first light guiding direction 92, and the first light guiding direction 92 is orthogonal to the incident ray 91. In other words, the incident direction of the incident ray 91 entering the first prism arrays 40 is orthogonal to the first light guiding direction 92 provided by the first prism arrays 40. From the perspective of FIG. 1C, the incident direction of the incident ray 91 is perpendicular to the substrate 30, and the first light guiding direction 92 is parallel to the substrate 30 and going from left to right, so the first light guiding direction 92 is orthogonal to the incident direction of the incident ray 91. Furthermore, the first light guiding direction 92 is a ray path jointly generated by a combination of the plurality the first prism arrays 40.

For example, the first prism arrays 40 of each row comprises a plurality of first isosceles triangle prisms 41 and a plurality of second isosceles triangle prisms 42. In this embodiment, the isosceles triangle prism which has the bottom surface facing the luminescent display panel 10 is referred to as a first isosceles triangle prism 41, and the isosceles triangle prism which has the bottom surface facing the substrate 30 is referred to as a second isosceles triangle prism 42. In other words, the bottom surface of each first isosceles triangle prism 41 faces the luminescent display panel 10, and the bottom surface of each second isosceles triangle prism 42 faces the substrate 30. Moreover, the first isosceles triangle prisms 41 and the second isosceles triangle prisms 42 are alternatively arranged, that is, the first isosceles triangle prisms 41 are disposed next to the second isosceles triangle prisms 42, and vice versa.

When the incident ray 91 enters the first prism arrays 40, the incident ray 91 is affected by the total internal reflection (TIR) effect of the first isosceles triangle prisms 41 and the second isosceles triangle prisms 42 to be guided along the first light guiding direction 92 to the second prisms 51. Specifically, the bottom surface of the first isosceles triangle prism 41 is used as the light incident surface 411, and the side close to the image capturing module 20 (for example, the right side surface) is used as the light-emitting surface 412. After receiving the incident ray 91 of the luminescent display panel 10 from the bottom surface (light incident surface 411), the light is transmitted from the side (light-emitting surface 412) to the adjacent second isosceles triangle prism 42. Moreover, the two sides of the second isosceles triangle prism 42 are used as the light incident surface 421 and the light-emitting surface 422 respectively, and the side away from the image capturing module 20 (for example, the left side surface) is the light incident surface 421, and the side surface close to the image capturing module 20 (for example, the right side surface) is the light-emitting surface 422. The second isosceles triangle prism 42 can receive the light transmitted by the first isosceles triangle prism 41 on the left side, and then transmit the light through the light-emitting surface surface 422 to the first isosceles triangle prism 41 on the right side. In addition, the side of the first isosceles triangle prism 41 away from the image capturing module 20 (for example, the left side surface) can also be used as the light incident surface 411 to receive the light from the second isosceles triangle prism 42 on the left side. By arranging the relative positions of the light incident surface 411, 421 and the light-emitting surface 412, 422, the incident ray 91 entering the first prism arrays 40 is guided by the first light guiding direction 92 to be transmitted to the second prisms 51.

In this embodiment, the second prisms 51 of the second prism array 50 provide a second light guiding direction 93. The second light guiding direction 93 is perpendicular to the first light guiding direction 92 and faces the image capturing module 20. Similarly, the second light guiding direction 93 is a ray path jointly generated by a plurality of second prisms 51 constituting the second prism array 50. For example, the second prisms 51 may be a right triangle prism, and the right angle end of the right triangle prism is close to one of the first prism arrays 40. Moreover, the side surface (for example, the left side surface) and the bottom surface close to the first prism arrays 40 are used as the light incident surface 511, and the side close to the image capturing module 20 (for example, the rear side surface) is used as the light-emitting surface 512. By arranging the relative positions of the light incident surface 511 and the light-emitting surface 512, the light entering the second prisms 51 is guided along the second light guiding direction 93 to the image capturing module 20.

Preferably, the substrate 30, the first prism arrays 40, and the second prism array 50 may be integrally formed to jointly achieve the light guiding function. The substrate 30 may be a rigid substrate made of material such as poly (methyl methacrylate) (PMMA, also known as acrylic). The substrate 30, the first prism arrays 40, and the second prism array may be simultaneously formed by injection molding or thermoforming. The substrate 30 may also be a flexible substrate made of material such as polyimide (PI). The substrate 30, the first prism arrays 40, and the second prism array may be simultaneously formed by imprinting.

In summary, when the incident ray 91 enters the first prism arrays 40, the incident ray 91 is guided along the first light guiding direction 92 to each of the second prisms 51 of the second prism array 50, and is then guided along the second light guiding direction 93 to the image capturing module 20. Moreover, since the first prism arrays 40 are arranged in parallel with each other on the substrate 30, and the second prisms 51 correspond to the first prism arrays 40 respectively, the light can be effectively transmitted to the image capturing module 20, wherein the image capturing module 20 can obtain the image of the whole surface of the cover 11. That is, in addition to effectively providing good quality of the captured image, the whole surface of the cover 11 can also serve as a sensing area for fingerprint recognition.

Preferably, the substrate 30 may comprise a reflective layer 31, for example, the surface facing the first prism arrays 40 and the second prism array 50 may have a reflective layer 31. The incident ray 91 emitted by the luminescent display panel 10 can be partially reflected by the reflective layer 31 to be guided to the first prism arrays 40 or the second prisms 51, and then be used for total reflection, thereby enhancing the quality of the image captured by the image capturing module 20.

Preferably, the fingerprint recognition device 1 further comprises a processing unit (not shown in figure) coupled with the image capturing module 20. The image capturing module 20 converts the acquired image of the whole surface of the cover 11 into corresponding image data and then transmits the image data to the processing unit for the latter to use the algorithm to perform fingerprint recognition.

Figure 2A:
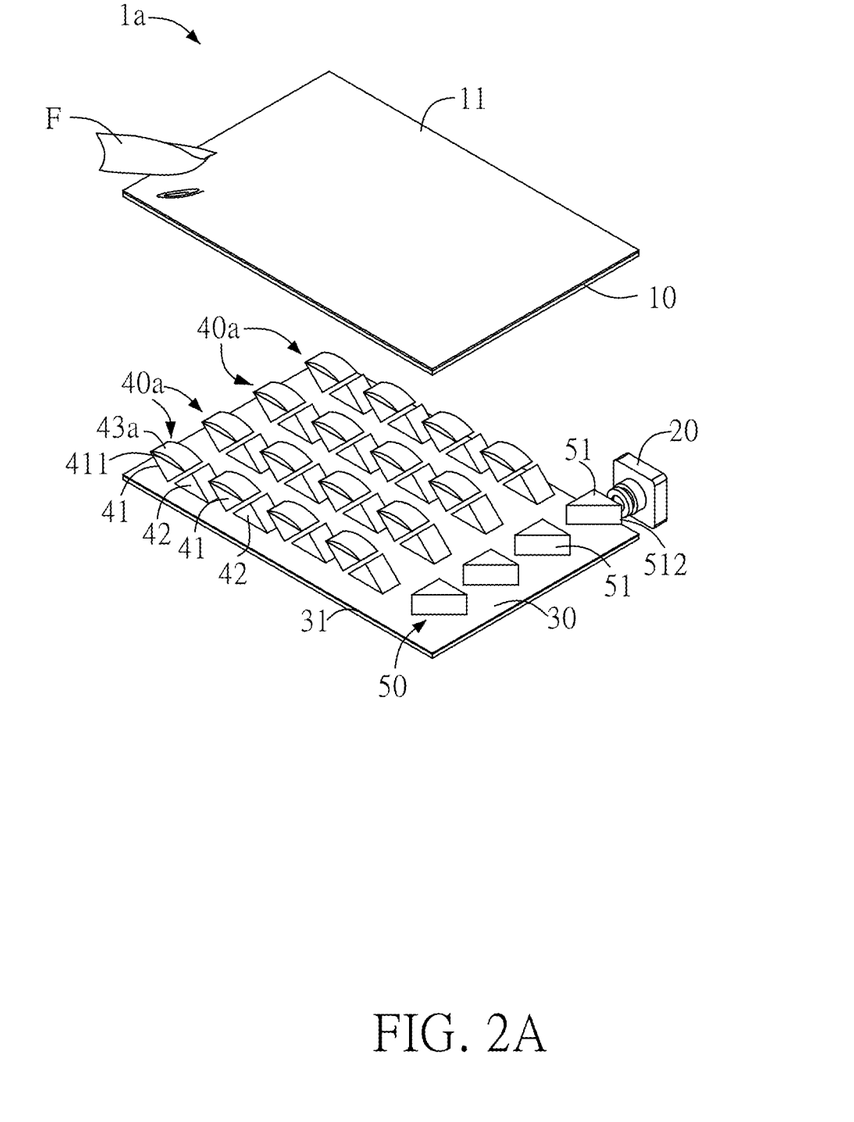
FIG. 2A illustrates a schematic view of a fingerprint recognition device according to a second embodiment of the present disclosure.
Figure 2B:
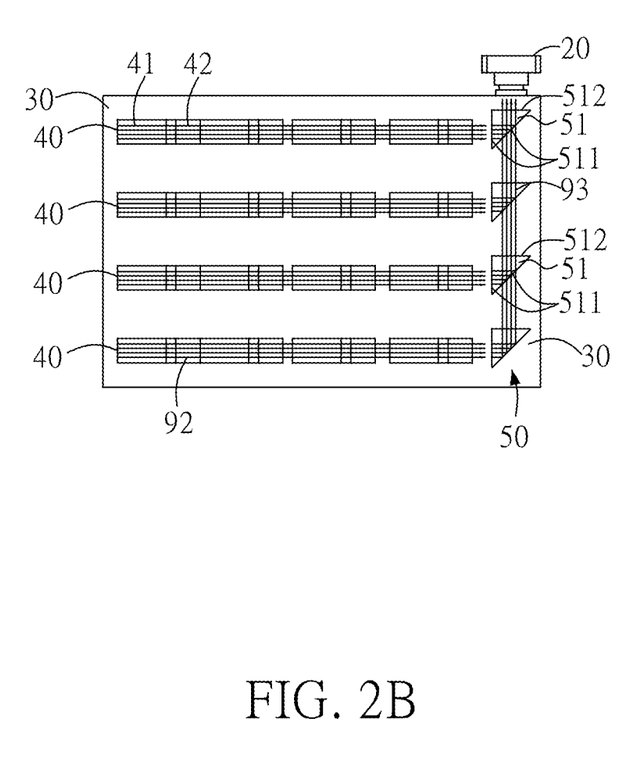
FIG. 2B illustrates a top view of the image capturing module, substrate, the first prism arrays, and the second prisms shown in FIG. 2A.
Figure 2C:
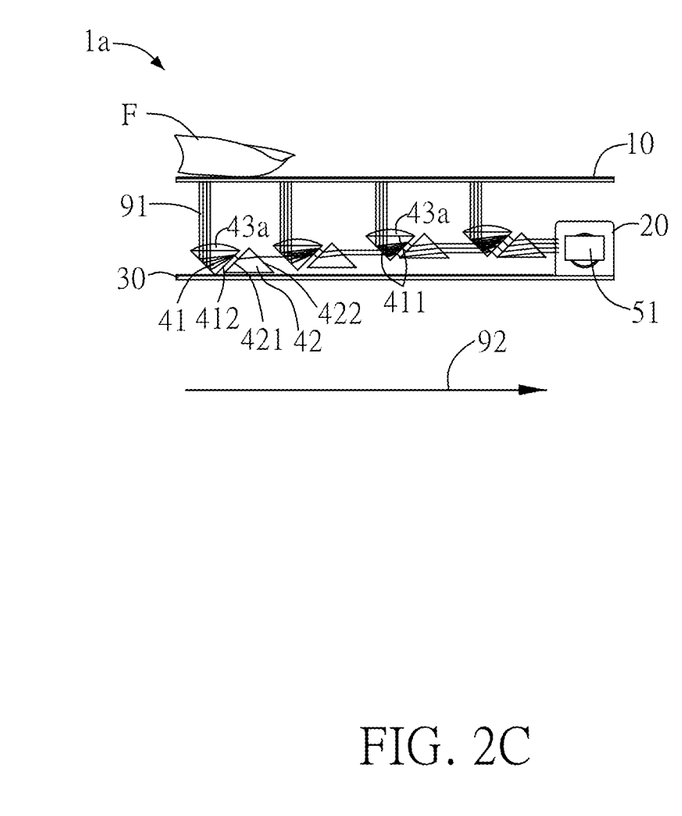
FIG. 2C illustrates a front view of the fingerprint recognition device shown in FIG. 2A.

FIG. 2A illustrates a schematic view of a fingerprint recognition device according to a second embodiment of the present disclosure, FIG. 2B illustrates a top view of the image capturing module, substrate, the first prism arrays, and the second prisms shown in FIG. 2A, and FIG. 2C illustrates a front view of the fingerprint recognition device shown in FIG. 2A, please refer to FIG. 2A, FIG. 2B, and FIG. 2C at the same time. The major elements of the fingerprint recognition device 1a of this embodiment can be referred to those of the first embodiment, with the same reference numerals denoting the same elements. The difference between this embodiment and the first embodiment is that the first prism arrays 40a of this present embodiment further comprise a plurality of lenses 43a, and the lenses 43a are respectively disposed on the bottom surfaces (light incident surfaces 411) of the first isosceles triangle prisms 41. By using the lenses 43a, a better light concentrating effect can be achieved. In other words, the amount of the incident ray 91 entering the first prism arrays 40a can be increased, thereby increasing the quality of the image captured by the image capturing module 20.

Figure 3A:
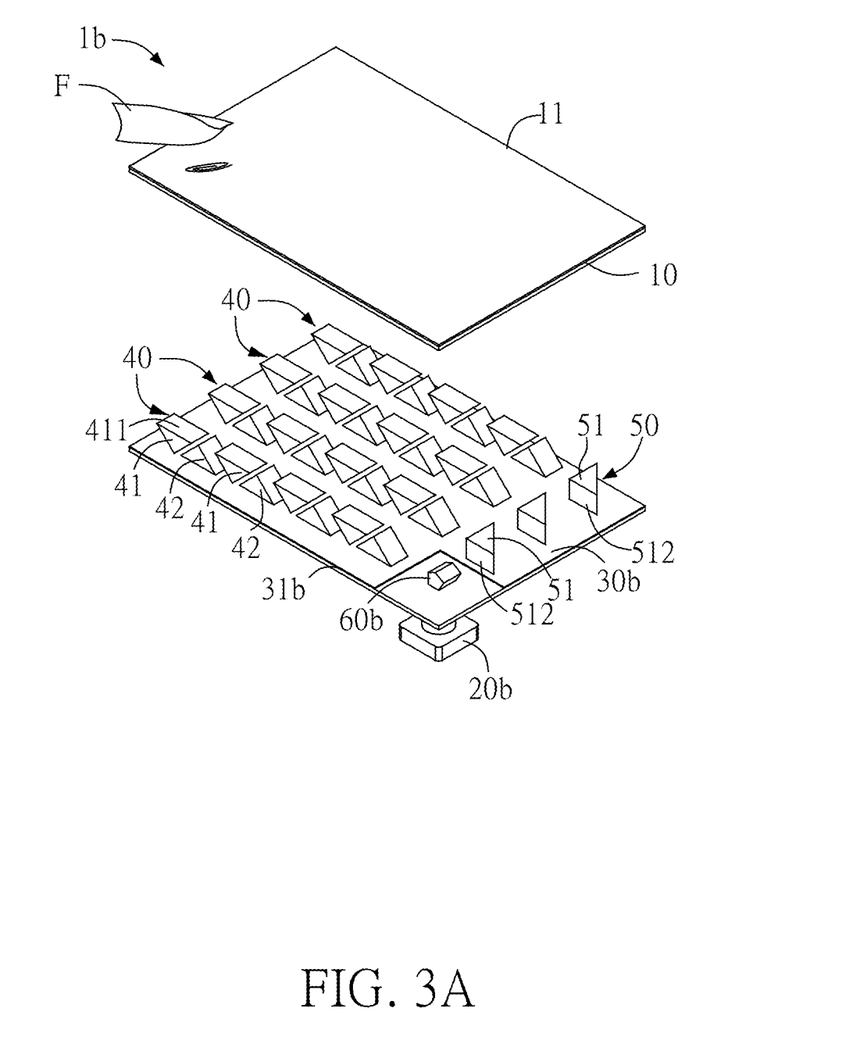
FIG. 3A illustrates a schematic view of a fingerprint recognition device according to a third embodiment of the present disclosure.
Figure 3B:
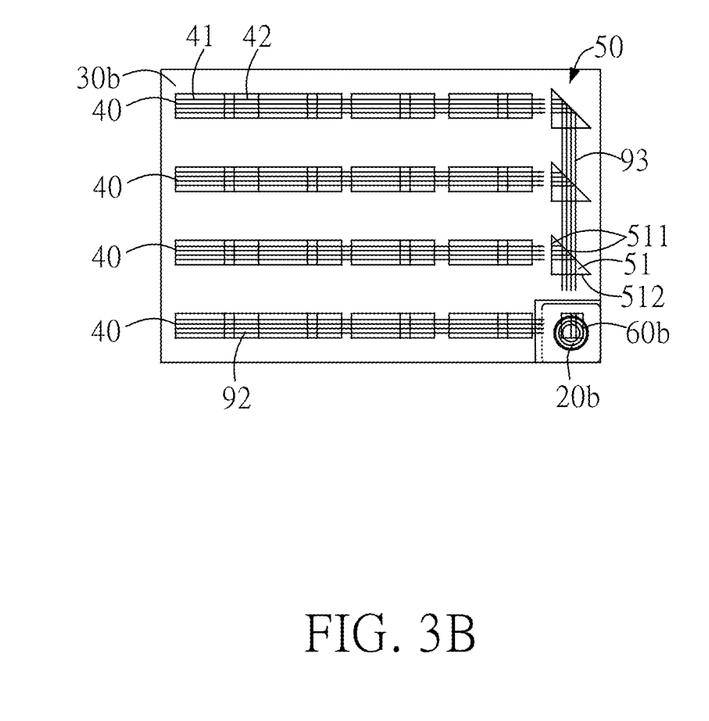
FIG. 3B illustrates a top view of the image capturing module, the substrate, the first prism arrays, the second prisms, and the light turning prism shown in FIG. 3A.
Figure 3C:
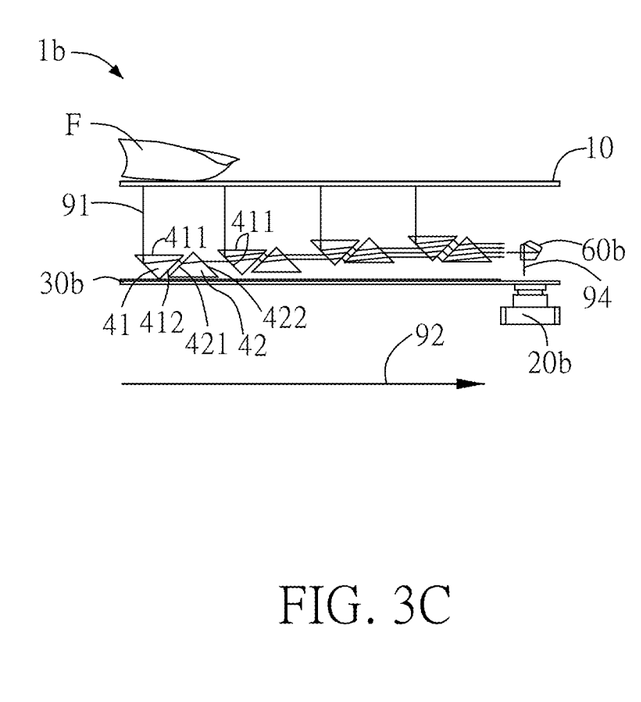
FIG. 3C illustrates a front view of the fingerprint recognition device shown in FIG. 3A.

FIG. 3A illustrates a schematic view of a fingerprint recognition device according to a third embodiment of the present disclosure, FIG. 3B illustrates a top view of the image capturing module, the substrate, the first prism arrays, the second prisms, and the light turning prism shown in FIG. 3A, and FIG. 3C illustrates a front view of the fingerprint recognition device shown in FIG. 3A, please refer to FIG. 3A, FIG. 3B, and FIG. 3C at the same time. The major elements of the fingerprint recognition device 1b of this embodiment can be referred to those of the first embodiment, with the same reference numerals denoting the same elements. The same configurations as those of the first embodiment will be briefly described first. The first prism arrays 40 are disposed in parallel with each other on the substrate 30b, and the first prism arrays 40 provide a first light guiding direction 92 that is orthogonal to the incident ray 91. Similarly, the second prisms 51 are disposed on the substrate 30b and correspond to the first prism arrays 40, respectively. The second prisms 51 provide a second light guiding direction 93 that is perpendicular to the first light guiding direction 92. Similarly, the first prism arrays 40 may comprise a plurality of first isosceles triangle prisms 41 and a plurality of second isosceles triangle prisms 42, and the second prisms 51 can be right triangle prisms.

The difference between this embodiment and the first embodiment is that the image capturing module 20b of the fingerprint recognition device 1b of the third embodiment is disposed on the side of the substrate 30b opposite to the luminescent display panel 10. From the perspective of FIG. 3A, the image capturing module 20b is located at the lower surface of the substrate 30b. It should be noted that the image capturing module 20b of this embodiment has the same component structure as the image capturing module 20 of the first embodiment, and different numerals are used due to different placement positions.

In addition, the fingerprint recognition device 1b of this embodiment further comprises a light turning prism 60b. The light turning prism 60b is disposed on the substrate 30b, and the light-emitting surface 512 of the second prisms 51 is facing the light turning prism 60b, so that the light turning prism 60b can receive light transmitted from the second prisms 51. The light turning prism 60b provides a third light guiding direction 94. As shown in FIG. 3C, the third light guiding direction 94 is orthogonal to the second light guiding direction 93 and faces the image capturing module 20b. In addition, the third light guiding direction 94 is also orthogonal to the first light guiding direction 92. In other words, the third light guiding direction 94 is the same as the direction in which the incident ray 91 enters the first prism arrays 40. The light turning prism 60b is a prism that can re-direct light to another plane, such as, but not limited to, a right angle prism, an amici prism, or a pentaprism. It should be noted that the substrate 30b of this embodiment also has a reflective layer 31b disposed on a different position other than the position on the substrate 30, for that the reflective layer 31b needs to avoid the image capturing position of the image capturing module 20b, so a different numeral is used.

Therefore, when the incident ray 91 enters the first prism arrays 40, the incident ray 91 can be guided to the second prisms 51 along the first light guiding direction 92, and then is guided to the light turning prism 60b along the second light guiding direction 93, and is finally guided to the image capturing module 20b on the lower surface of the substrate 30b along the third light guiding direction 94. In addition, the first prism arrays 40 close to the light turning prism 60b can also directly guide the incident ray 91 to the light turning prism 60b along the first light guiding direction 92. Then the incident ray 91 can be guided to the image capturing module 20b along the third light guiding direction 94. Similarly, the image capturing module 20b converts the acquired image of the whole surface of the cover 11 into corresponding image data, and then transmits the image data to the processing unit for the processing unit to use the algorithm to perform fingerprint recognition.

Figure 4A:
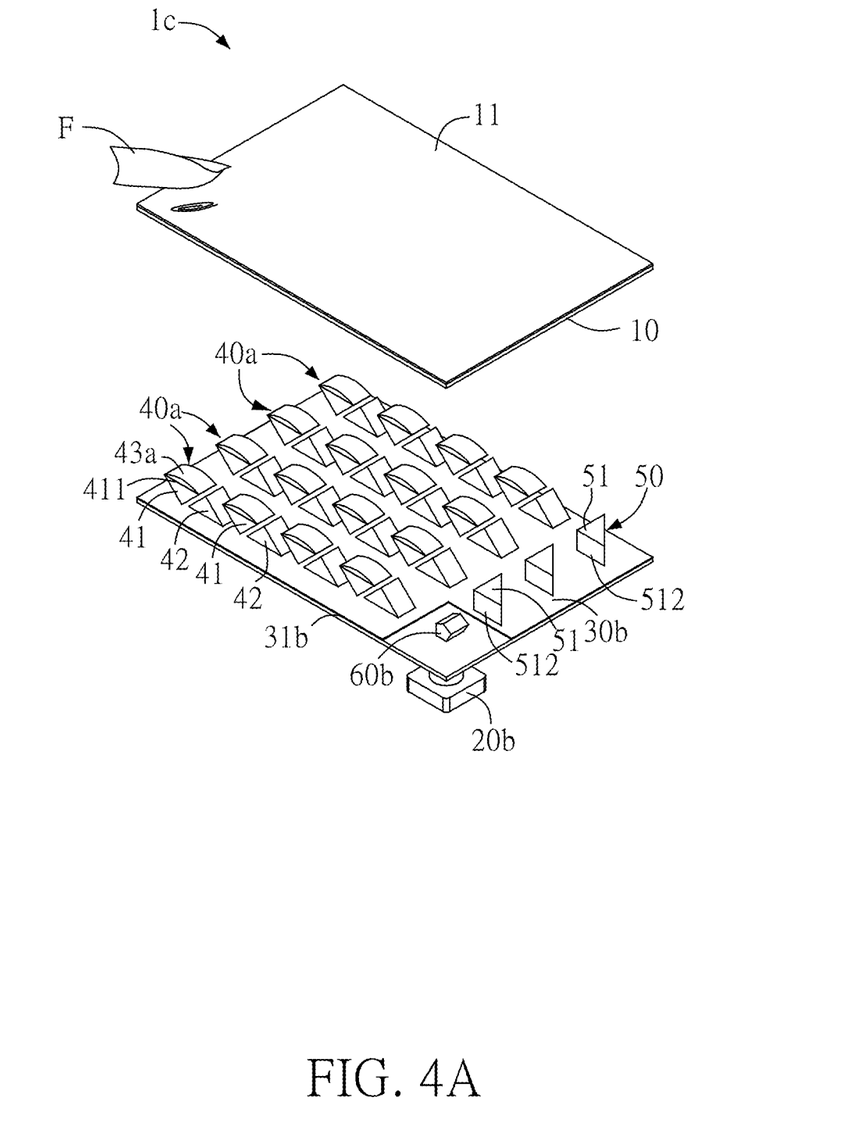
FIG. 4A illustrates a schematic view of a fingerprint recognition device according to a fourth embodiment of the present disclosure.
Figure 4B:
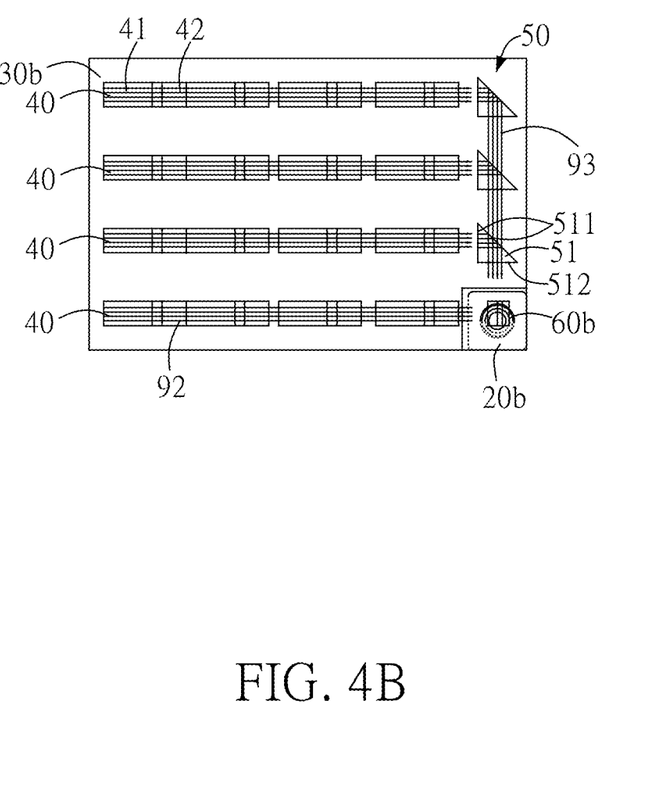
FIG. 4B illustrates a top view of the image capturing module, the substrate, the first prism arrays, the second prisms, and the light turning prism shown in FIG. 4A.
Figure 4C:
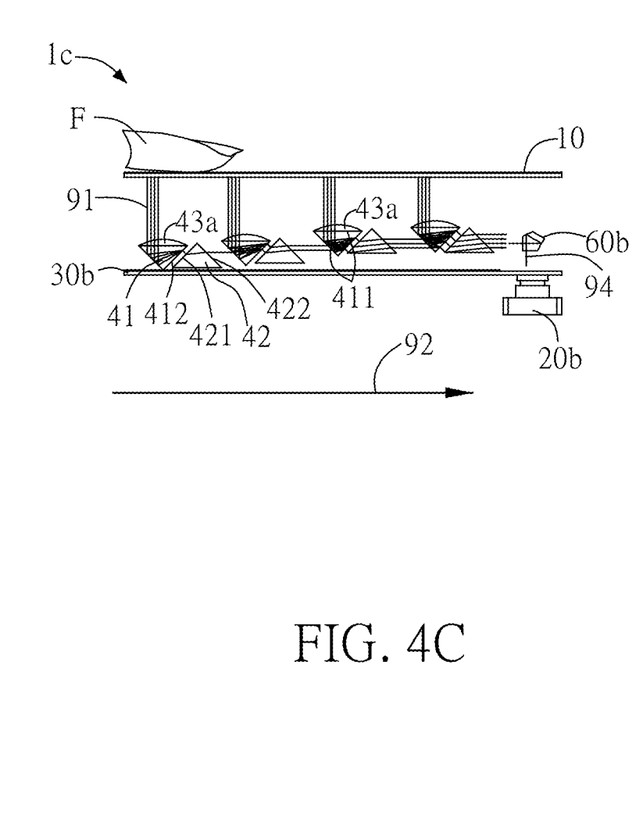
FIG. 4C illustrates a front view of the fingerprint recognition device shown in FIG. 4A.

FIG. 4A illustrates a schematic view of a fingerprint recognition device according to a fourth embodiment of the present disclosure, FIG. 4B illustrates a top view of the image capturing module, the substrate, the first prism arrays, the second prisms, and the light turning prism shown in FIG. 4A, and FIG. 4C illustrates a front view of the fingerprint recognition device shown in FIG. 4A, please refer to FIG. 4A, FIG. 4B, and FIG. 4C at the same time. The major elements of the fingerprint recognition device 1c of this embodiment can be referred to those of the third embodiment, with the same reference numerals denoting the same elements. The difference between this embodiment and the third embodiment is that the first prism arrays 40a of this embodiment are the same as those of the second embodiment, and further comprise a plurality of lenses 43a, and the lenses 43a are respectively disposed on the bottom surfaces (light incident surfaces 411) of the first isosceles triangle prisms 41, thereby increasing the quality of the image captured by the image capturing module 20.

Figure 5A:
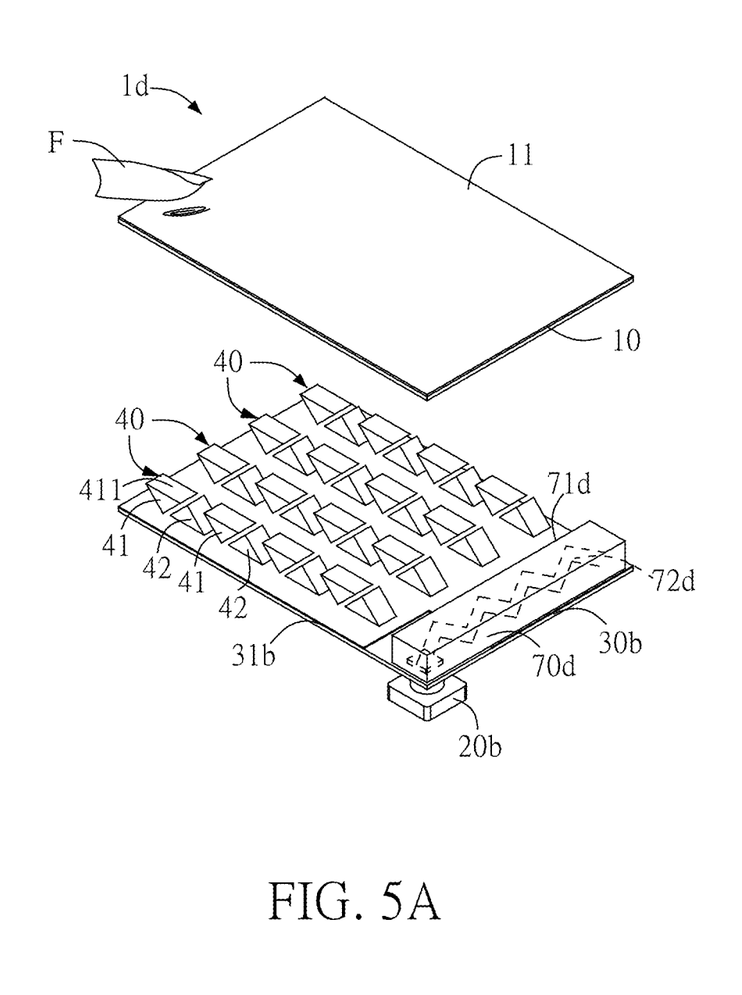
FIG. 5A illustrates a schematic view of a fingerprint recognition device according to a fifth embodiment of the present disclosure.
Figure 5B:
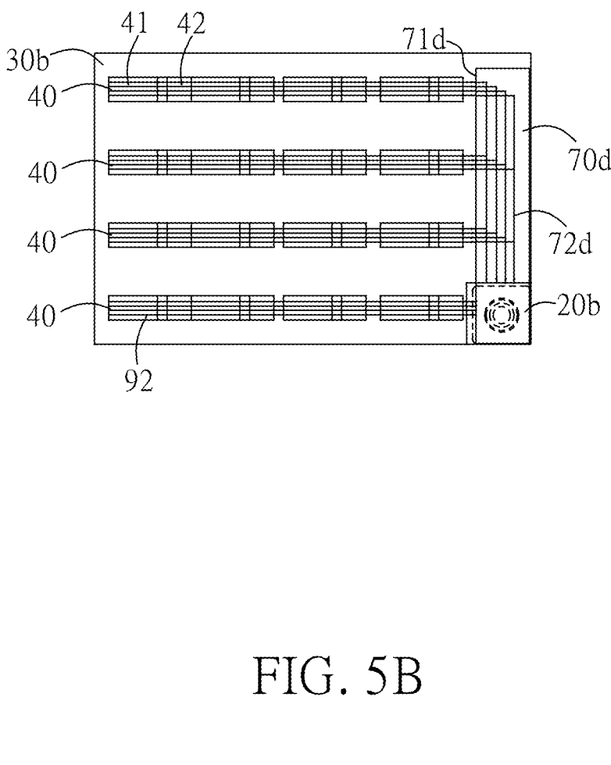
FIG. 5B illustrates a top view of the image capturing module, the substrate, the first prism arrays, and the optical waveguide component shown in FIG. 5A.
Figure 5C:
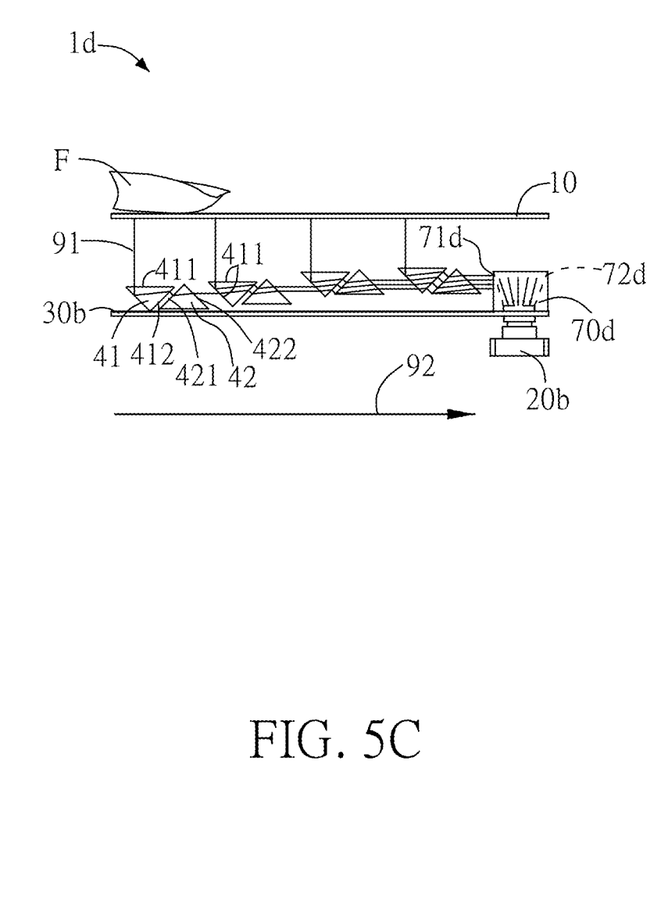
FIG. 5C illustrates a front view of the fingerprint recognition device shown in FIG. 5A.

FIG. 5A illustrates a schematic view of a fingerprint recognition device according to a fifth embodiment of the present disclosure, FIG. 5B illustrates a top view of the image capturing module, the substrate, the first prism arrays, and the optical waveguide component shown in FIG. 5A, and FIG. 5C illustrates a front view of the fingerprint recognition device shown in FIG. 5A, please refer to FIG. 5A, FIG. 5B, and FIG. 5C at the same time. The fingerprint recognition device 1d comprises the luminescent display panel 10, the substrate 30b, the image capturing module 20b, the plurality of first prism array 40 and an optical waveguide component 70d. The component structure and configuration of the luminescent display panel 10 and the first prism arrays 40 are the same as those of the first embodiment, so the same reference numerals are used. The image capturing module 20b of this embodiment is disposed on the side of the substrate 30b opposite to the luminescent display panel 10, and the reflective layer 31b of the substrate 30b is disposed the same way as that of the third embodiment to avoid the image capturing position of the image capturing module 20b, so the same reference numerals are used. The difference between this embodiment and the third embodiment is that this embodiment replaces the second prisms 51 and the light turning prism 60b with the optical waveguide component 70d.

Figure 5D:
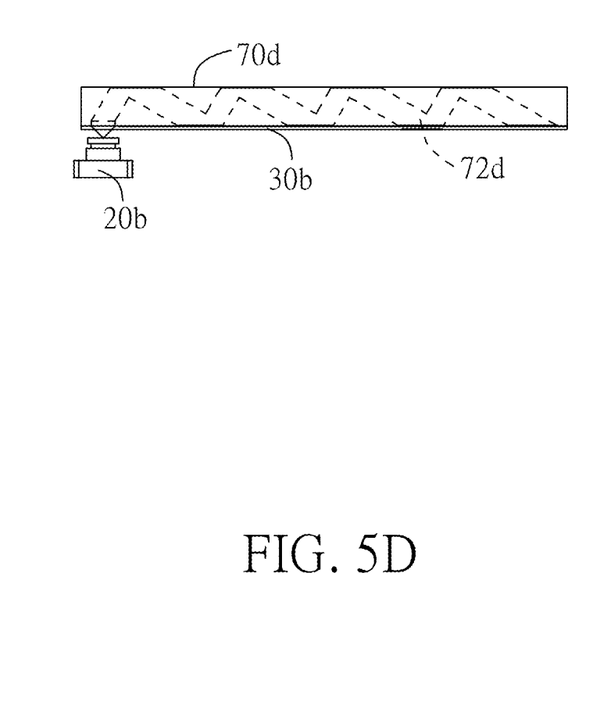
FIG. 5D is a right side view of the image capturing module, the substrate, and the optical waveguide component shown in FIG. 5C.

Specifically, the optical waveguide component 70d is disposed on the substrate 30b. The optical waveguide component 70d comprises a light incident surface 71d and a light guiding path 72d. The light incident surface 71d is a surface of the optical waveguide component 70d facing the first prism arrays 40, and the light guiding path 72d is located inside the optical waveguide component 70d, and the light guiding path 72d faces the image capturing module 20b, as shown in FIG. 5D, wherein FIG. 5D is a right side view of the image capturing module, the substrate, and the optical waveguide component shown in FIG. 5C. For example, a plurality of prisms may be disposed in the optical waveguide component 70d or micro-ridges may be disposed on the surface of the lenses to form a light guiding path 72d having a plurality of refractions, and the guiding direction of the light guiding path 72d faces the image capturing module 20b. The first prism arrays 40 receives the incident ray 91 from the luminescent display panel 10, and then directs the light to the optical waveguide component 70d along the first light guiding direction 92. Thereafter, the light coming from the light incident surface 71d enters the light guiding path 72d inside the optical waveguide component 70d, and can be guided to the image capturing module along the light guiding path 72d. Similarly, the image capturing module 20b converts the acquired image of the whole surface of the cover 11 into corresponding image data, and then transmits the image data to the processing unit for the processing unit to use the algorithm to perform fingerprint recognition.

Figure 6A:
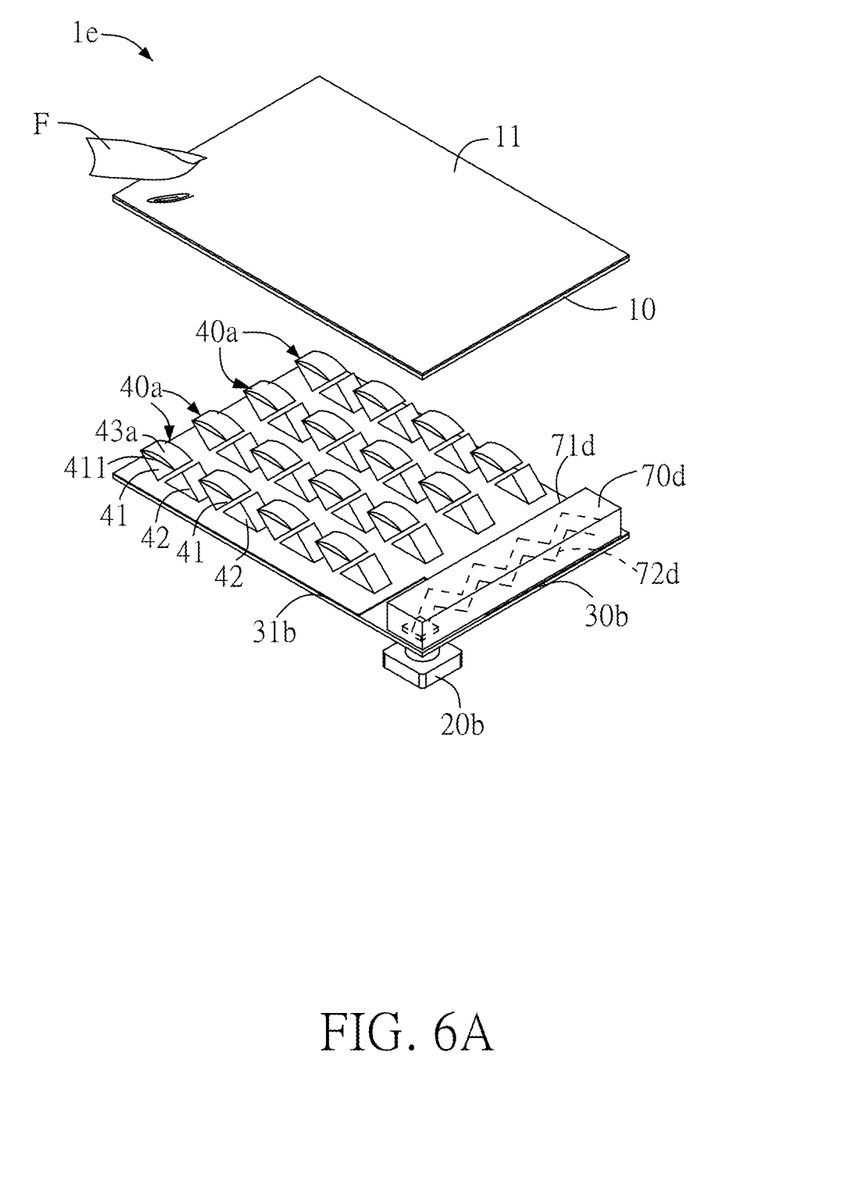
FIG. 6A illustrates a schematic view of a fingerprint recognition device according to a sixth embodiment of the present disclosure.
Figure 6B:
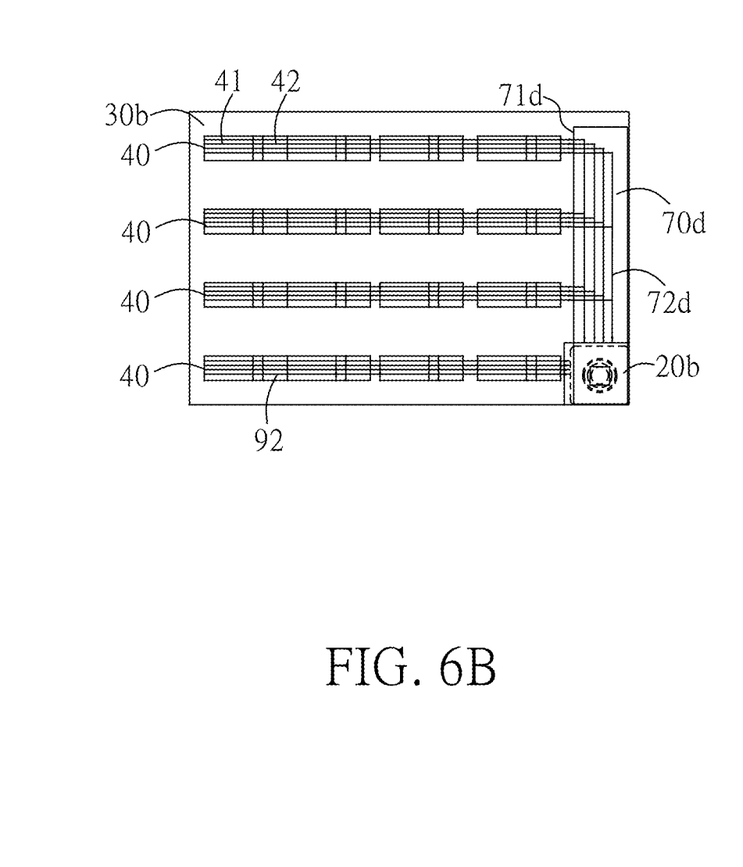
FIG. 6B illustrates a top view of the image capturing module, the substrate, the first prism arrays, and the optical waveguide component shown in FIG. 6A.
Figure 6C:
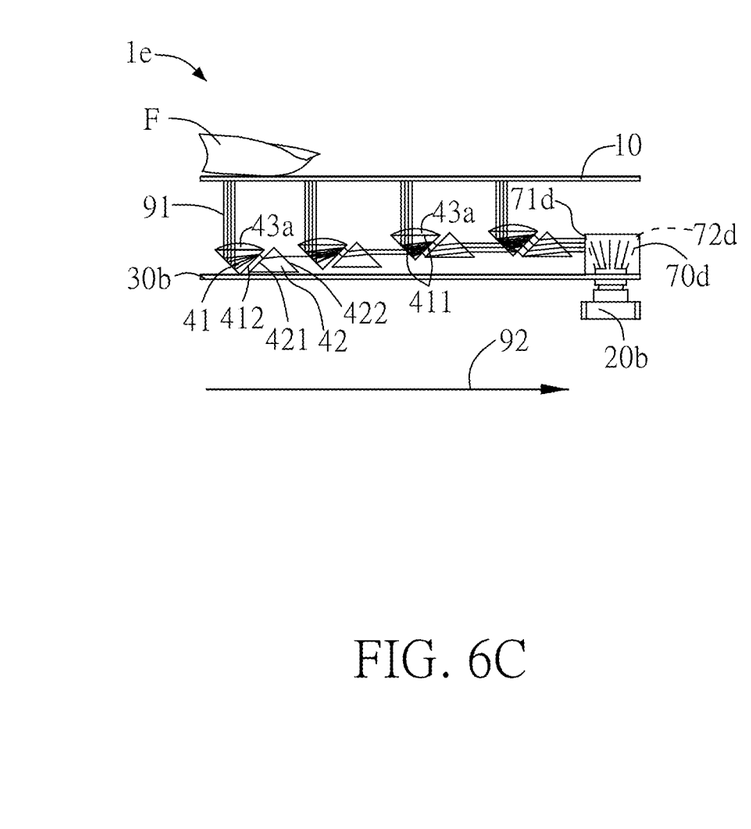
FIG. 6C illustrates a front view of the fingerprint recognition device shown in FIG. 6A.

FIG. 6A illustrates a schematic view of a fingerprint recognition device according to a sixth embodiment of the present disclosure, FIG. 6B illustrates a top view of the image capturing module, the substrate, the first prism arrays, and the optical waveguide component shown in FIG. 6A, and FIG. 6C illustrates a front view of the fingerprint recognition device shown in FIG. 6A, please refer to FIG. 6A, FIG. 6B, and FIG. 6C at the same time. The major elements of the fingerprint recognition device 1e of this embodiment can be referred to those of the fifth embodiment, with the same reference numerals denoting the same elements. The difference between this embodiment and the fifth embodiment is that the first prism arrays 40a of this embodiment is the same as the second embodiment (so the same numeral is used), and further comprises a plurality of lenses 43a disposed at the bottom surfaces of the first isosceles triangle prisms 41 (light incident surfaces 411). As described above, the lenses 43a can be used to achieve a better concentrating effect, thereby increasing the quality of the image captured by the image capturing module 20.

In summary, according to the fingerprint recognition device of the present disclosure, the first prism arrays are arranged in parallel with each other on the substrate, working with the second prisms, the light turning prism, or the optical waveguide component to effectively transmit the incident ray emitted by the luminescent display panel to the image capturing module. Moreover, since the first prism arrays are arranged in parallel with each other on the substrate, the light can be effectively transmitted to the image capturing module, wherein the image capturing module can obtain the image of the whole surface of the cover. That is, in addition to effectively providing good quality of the captured image, the whole surface of the cover 11 can also serve as a sensing area for fingerprint recognition.

It is noted that the above-described embodiment is merely illustrative of a preferred embodiment of the present disclosure, and in order to avoid redundancy, all possible combinations of variations are not described in detail, various changes and modifications may be made to the described embodiments without departing from the scope of the disclosure as described by the appended claims.

What is claimed is:

1. A fingerprint recognition device comprising:
a luminescent display panel having a cover;
a substrate disposed on a side of the luminescent display panel opposite to the cover;
an image capturing module disposed on one side of the substrate;
a plurality of first prism arrays disposed on the substrate and paralleled to each other, and each of the first prism arrays receiving an incident ray from the luminescent display panel, the first prism arrays providing a first light guiding direction, wherein the first light guiding direction is orthogonal to the incident ray; and
a plurality of second prisms disposed on the substrate, and the second prisms corresponding to the first prism arrays respectively, each of the second prisms having a light-emitting surface, with the light-emitting surface facing toward the image capturing module, the second prisms providing a second light guiding direction, wherein the second light guiding direction is perpendicular to the first light guiding direction.

2. The fingerprint recognition device as claimed in claim 1, wherein the incident ray enters the first prism arrays and is guided along the first light guiding direction to the second prisms, and is then guided along the second light guiding direction to the image capturing module.

3. The fingerprint recognition device as claimed in claim 1, wherein the first prism arrays comprise a plurality of first isosceles triangle prisms and a plurality of second isosceles triangle prisms, and a bottom surface of each of the first isosceles triangles faces the luminescent display panel, a bottom surface of each of the second isosceles triangles faces the substrate, and the first isosceles triangle prisms and the second isosceles triangle prisms are alternately arranged with respect to one another.

4. The fingerprint recognition device as claimed in claim 3, wherein each of the first arrays further comprises a plurality of lenses respectively disposed on the bottom surfaces of the first isosceles triangle prisms.

5. The fingerprint recognition device as claimed in claim 3, wherein each of the second prisms is a right triangle prism respectively, and a right angle end of the right triangle prism is close to one of the first prism arrays.

6. The fingerprint recognition device as claimed in claim 1, wherein each substrate comprises a reflective layer.

7. The fingerprint recognition device as claimed in claim 1, wherein the luminescent display panel is an organic light-emitting display panel.

8. A fingerprint recognition device comprising:
a luminescent display panel having a cover;
a substrate disposed on a side of the luminescent display panel opposite to the cover;
an image capturing module disposed on one side of the substrate opposite to the luminescent display panel;
a plurality of first prism arrays disposed on the substrate and paralleled to each other, and each of the first prism arrays receiving an incident ray from the luminescent display panel, the first prism arrays providing a first light guiding direction, wherein the first light guiding direction is orthogonal to the incident ray;
a plurality of second prisms disposed on the substrate, and the second prisms corresponding to the first prism arrays respectively, each of the second prisms having a light-emitting surface, the second prisms providing a second light guiding direction, wherein the second light guiding direction is perpendicular to the first light guiding direction; and
a light turning prism disposed on the substrate, with the light-emitting surface of each of the second prisms facing the light turning prism, and the light turning prism providing a third light guiding direction, wherein the third light guiding direction is orthogonal to the second light guiding direction and is directed toward the image capturing module.

9. The fingerprint recognition device as claimed in claim 8, wherein the incident ray enters the first prism arrays and is guided along the first light guiding direction to the second prisms, and is then guided along the second light guiding direction to the light turning prism, and is then guided along the third light guiding direction to the image capturing module.

10. The fingerprint recognition device as claimed in claim 8, wherein the light turning prism comprises a right angle prism, an amici prism, or a pentaprism.

11. The fingerprint recognition device as claimed in claim 8, wherein the first prism arrays comprise a plurality of first isosceles triangle prisms and a plurality of second isosceles triangle prisms, and a bottom surface of each of the first isosceles triangles faces the luminescent display panel, a bottom surface of each of the second isosceles triangles faces the substrate, and the first isosceles triangle prisms and the second isosceles triangle prisms are alternately arranged with respect to one another.

12. The fingerprint recognition device as claimed in claim 11, wherein each of the first arrays further comprises a plurality of lenses respectively disposed on the bottom surfaces of the first isosceles triangle prisms.

13. The fingerprint recognition device as claimed in claim 8, wherein each of the second prisms is a right triangle prism respectively, and a right angle end of the right triangle prism is close to one of the first prism arrays.

14. The fingerprint recognition device as claimed in claim 8, wherein each substrate comprises a reflective layer.

15. The fingerprint recognition device as claimed in claim 8, wherein the luminescent display panel is an organic light-emitting display panel.

16. A fingerprint recognition device comprising:
a luminescent display panel having a cover;
a substrate disposed on a side of the luminescent display panel opposite to the cover;
an image capturing module disposed on one side of the substrate opposite to the luminescent display panel;
a plurality of first prism arrays disposed on the substrate and paralleled to each other, and each of the first prism arrays receiving an incident ray from the luminescent display panel, the first prism arrays providing a first light guiding direction, wherein the first light guiding direction is orthogonal to the incident ray; and
an optical waveguide component disposed on the substrate, the optical waveguide component comprising a light incident surface and a light guiding path, wherein the light incident surface faces the first prism arrays, and the light guiding path faces the image capturing module.

17. The fingerprint recognition device as claimed in claim 16, wherein the incident ray enters the first prism arrays and is guided to the optical waveguide component along the first light guiding direction, and is then guided along the light guiding path to the image capture module.

18. The fingerprint recognition device as claimed in claim 16, wherein the first prism arrays comprise a plurality of first isosceles triangle prisms and a plurality of second isosceles triangle prisms, and a bottom surface of each of the first isosceles triangles faces the luminescent display panel, a bottom surface of each of the second isosceles triangles faces the substrate, and the first isosceles triangle prisms and the second isosceles triangle prisms are alternately arranged with respect to one another.

19. The fingerprint recognition device as claimed in claim 18, wherein each of the first arrays further comprises a plurality of lenses respectively disposed on the bottom surfaces of the first isosceles triangle prisms.

20. The fingerprint recognition device as claimed in claim 16, wherein the substrate comprises a reflective layer.

21. The fingerprint recognition device as claimed in claim 16, wherein the luminescent display panel is an organic light-emitting display panel.

* * * * *